United States Patent [19]

Agtuca

[11] Patent Number: 5,478,189
[45] Date of Patent: Dec. 26, 1995

[54] LIFT GATE CARGO CART

[76] Inventor: Peter T. Agtuca, 18010 108th Ave. SE., Renton, Wash. 98055

[21] Appl. No.: 206,957

[22] Filed: Mar. 7, 1994

[51] Int. Cl.$^6$ ..................................................... B60P 1/52
[52] U.S. Cl. ........................ 414/529; 414/345; 414/401
[58] Field of Search ..................................... 414/467, 345, 414/340, 529, 530, 531, 532, 533, 534, 535, 536, 346, 498, 585, 584, 401, 608, 545, 556, 557, 334, 540; 108/51.1, 55.1; 280/43.24, 43.12, 43

[56] References Cited

U.S. PATENT DOCUMENTS

| 1,088,263 | 4/1913 | Davy | 280/43.3 |
|---|---|---|---|
| 2,813,642 | 11/1957 | Fisher | 414/536 |
| 2,932,527 | 4/1960 | Payne | 280/43.24 |
| 2,947,565 | 8/1960 | Wood | 296/3 |
| 4,231,695 | 11/1980 | Weston | 410/69 |
| 4,347,794 | 9/1982 | Nordstrom | 108/51.1 |
| 4,408,666 | 10/1983 | Lawson | 414/334 X |
| 4,834,000 | 5/1989 | Darnell et al. | 108/51.1 |
| 4,873,732 | 10/1989 | Perez | 414/345 X |

FOREIGN PATENT DOCUMENTS

| 948948 | 7/1949 | Germany | 414/557 |
|---|---|---|---|
| 2033474 | 1/1971 | Germany | 414/557 |
| 23836 | 1/1987 | Japan | 414/557 |

Primary Examiner—Michael S. Huppert
Assistant Examiner—Stephen Gordon
Attorney, Agent, or Firm—Craine & Jackson

[57] ABSTRACT

Disclosed herein is a lift gate cargo cart made of strong, lightweight material, which includes a pallet structure designed to transport cargo that can be selectively attached to the hydraulic lift gate on a delivery truck. When attached to the lift gate, the lift gate cargo cart can be lifted to the level of the bed of the truck for loading and unloading cargo therefrom. The pallet structure includes a rigid frame with a plurality of wheel assemblies mounted on the bottom surface thereof which enables the cargo cart to be manually moved across a horizontal surface. Attached to the top surface of the rigid frame are two roller assemblies aligned in a parallel manner which enable cargo to be manually pushed or pulled over the cargo cart during use. Attached to the front surface of pallet structure is a connection bar which together with a plurality of bolts and washer plates, are used to engage the lift gate on a delivery truck. Optional walkways may be attached to the sides of the pallet structure which enables workers to work safely adjacent to the pallet structure when the pallet structure is lifted to an elevated position.

11 Claims, 4 Drawing Sheets

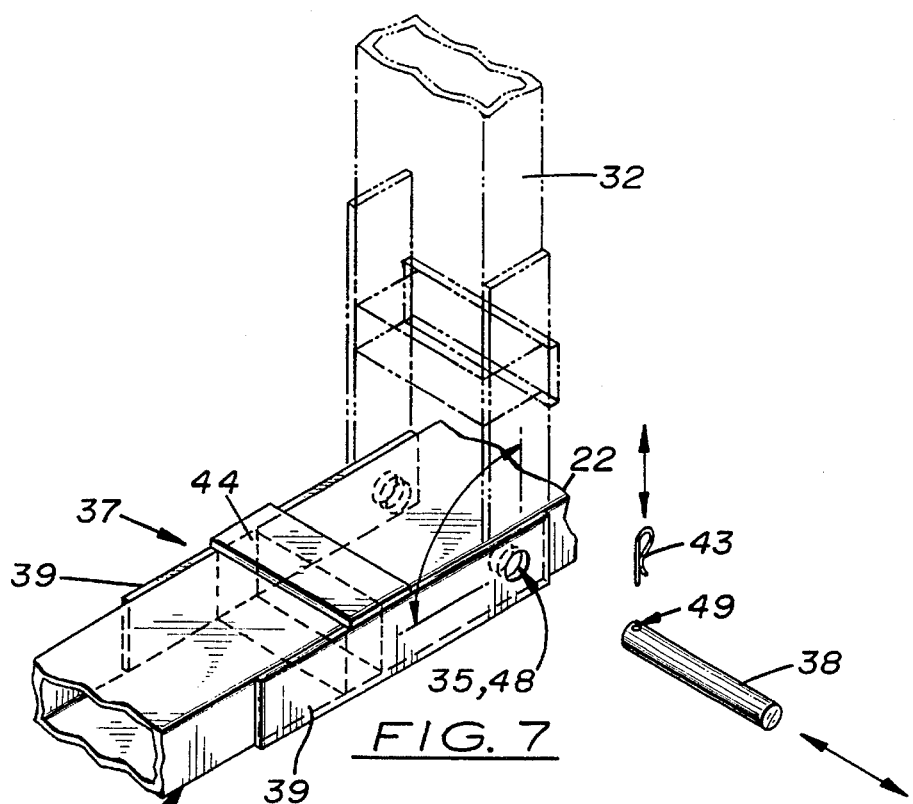
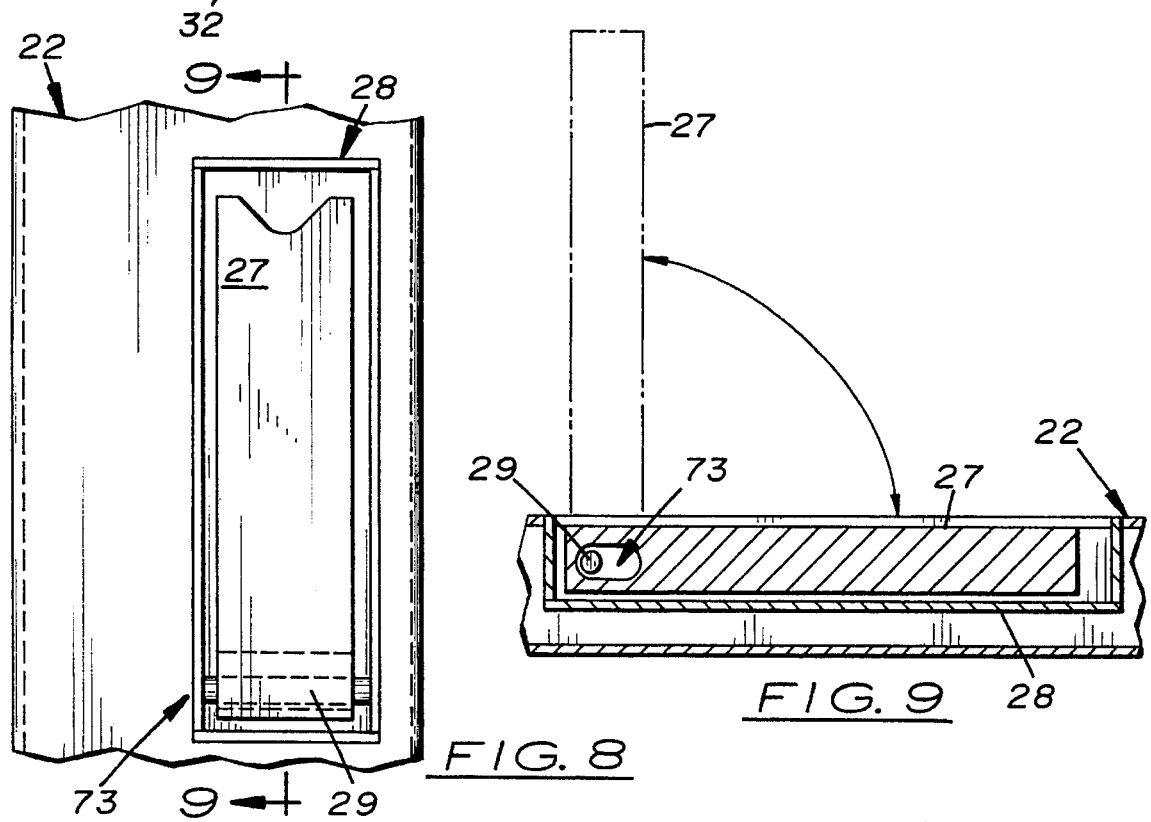

5,478,189

LIFT GATE CARGO CART

BACKGROUND OF THE INVENTION

1. Field of the Invention

This invention relates to cargo shipping platforms or carts mounted on wheels, and more particularly, to cargo carts capable of being selectively attached to a hydraulic lift gate on a delivery truck.

2. Description of the Related Art

Today, airline companies transport cargo in large containers capable of being efficiently transported in the fuselage of their airplanes. Typically, the cargo is first transported by truck to the airline company's loading dock located at the airport where it is manually sorted and placed inside a cargo container. The cargo container is then loaded onto the airplane. The cargo container is then flown to the airport located near the cargo's final destination. When the cargo container arrives at the airport, it is unloaded from the airplane and transported to the airline company's unloading dock. There, the cargo is manually removed from the cargo container and placed in a truck and delivered to its final destination.

In a previously filed U.S. patent application (Ser. No. 07/981,826), the inventor disclosed a cargo container cart designed to be used with a half-size or full-size cargo containers commonly used today in the air cargo industry. The cart container cart was specifically designed to overcome many of the problems that, until then, had prevented such cargo containers from being used inside and between businesses. More particularly, the cart container cart enabled companies to load and unload containers more efficiently.

One drawback with using such cargo container carts, as well as other types of carts, was that they could not be used efficiently at locations that did not have loading docks. As a result, any cargo had to be manually moved between the ground and the truck bed using a hydraulic lift gate or an attachable ramp.

Since many business use delivery trucks having hydraulic lift gates, the invention disclosed herein is designed to provide a lift gate cargo cart that can be selectively and securely attached to a hydraulic lift gate to enable cargo to be efficiently loaded and unloaded from the delivery truck.

SUMMARY OF THE INVENTION

It is general object of the present invention to provide a lightweight, movable container cargo cart designed to carry cargo or a small cargo container approximately one-half the size of a full-size cargo container commonly used today by air shipping companies to ship goods.

It is an object of the present invention to provide such a cargo cart that includes means for selectively and securely attaching it to a standard hydraulic lift gate on a delivery truck.

It is a further object of the present invention to provide such a cargo cart that can be used with a container cart having a rolling top surface so that cargo may be easily moved onto and off therefrom.

The present invention is a cargo cart designed to carry a cargo transported by a delivery truck. The cargo cart includes a pallet structure constructed of strong, durable material designed to carry cargo weighing at least the maximum amount of weight lifted by a standard lift gate. The pallet structure includes a rigid frame mounted on four, low profile, caster wheel assemblies which enable the cargo cart to be selectively pushed or pulled over a flat surface. Attached to the top surface of the rigid frame are two roller assemblies. The roller assemblies are spaced apart and longitudinally aligned in a parallel manner so that wide cargo may be supported thereon and loaded or unloaded from the cargo cart by sliding action along the rigid frame's transverse axis. The two roller assemblies extend across the rigid frame from the front surface to the rear surface thereof.

Attached to opposite sides of the pallet structure are two walkways which enable workers to stand upright on the cargo cart adjacent to the pallet structure when the cargo cart is attached to the lift gate and elevated to the level of the truck bed. Vertically extending hand rails are attached to the sides of the walkways to prevent the workers from falling off. The walkways are attached to the pallet structure with hinges which enable the walkways to fold upward into a vertically aligned position for compact and easy storage when not in use. The hinges can also be disassembled so that the walkways may be removed from the pallet structure when desired.

Attached to the top surface of the pallet structure in front of each roller assembly is a stop means which are used to prevent undesired movement of a cargo placed on the roller assemblies. The stop means may be selectively adjusted by the user between either blocking or non-blocking positions. Also attached to the front surface of the container cart is a height adjustment means which enables the user to selectively raise the front surface of the rigid frame above the ground to facilitate attachment to a lift gate.

Attached to the front surface of the container cart is a universally adaptable lift gate connecting means which enables the cargo cart to be selectively and securely attached to a lift gate. When attached to the lift gate, the cargo cart may be raised to the elevation of the truck bed to facilitate loading or unloading of cargo on or off the truck.

BRIEF DESCRIPTION OF THE DRAWINGS

FIG. 7 is a partial perspective view of the hinge disposed between the main beam on the walkway and an adjoining longitudinal member on the pallet structure with the walkway being rotated upward.

FIG. 8 is a partial top plan view of a stop pin located in a housing manufactured in a longitudinal member.

FIG. 9 is a sectional view taken along line 9—9 in FIG. 8 showing the stop pin in the housing and moving between a downward retracted position and an upward extending position.

DESCRIPTION OF THE PREFERRED EMBODIMENT(S)

Figure 1:
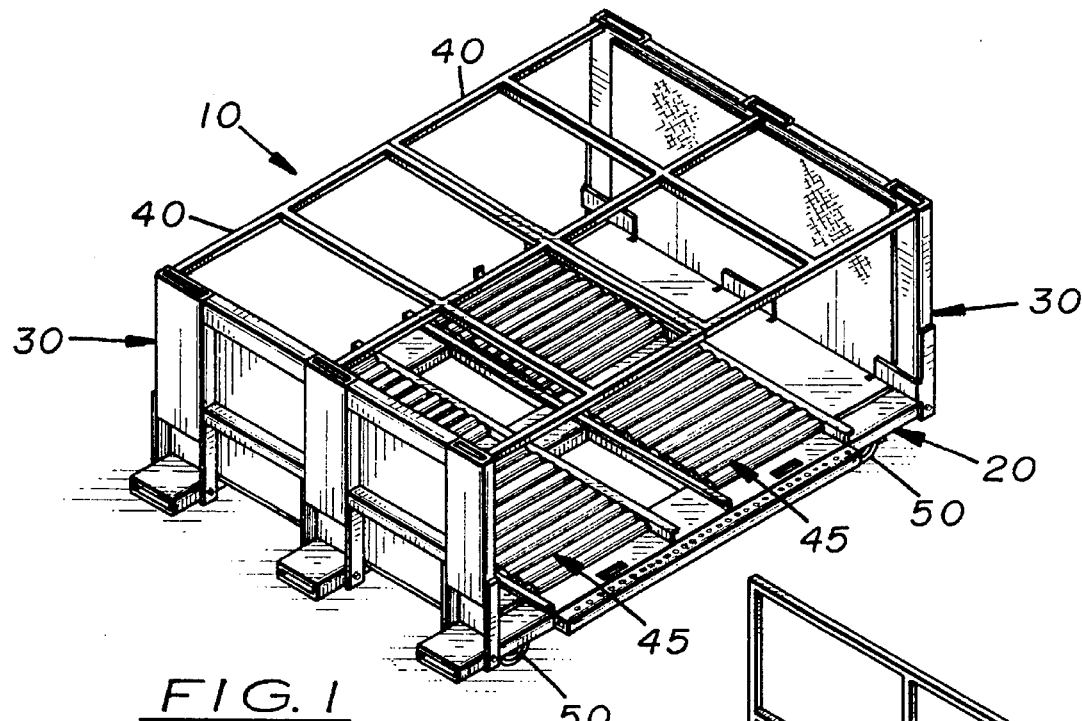
FIG. 1 is a perspective view of the cargo cart with the walkways folded upward for easy storage.
Figure 2:
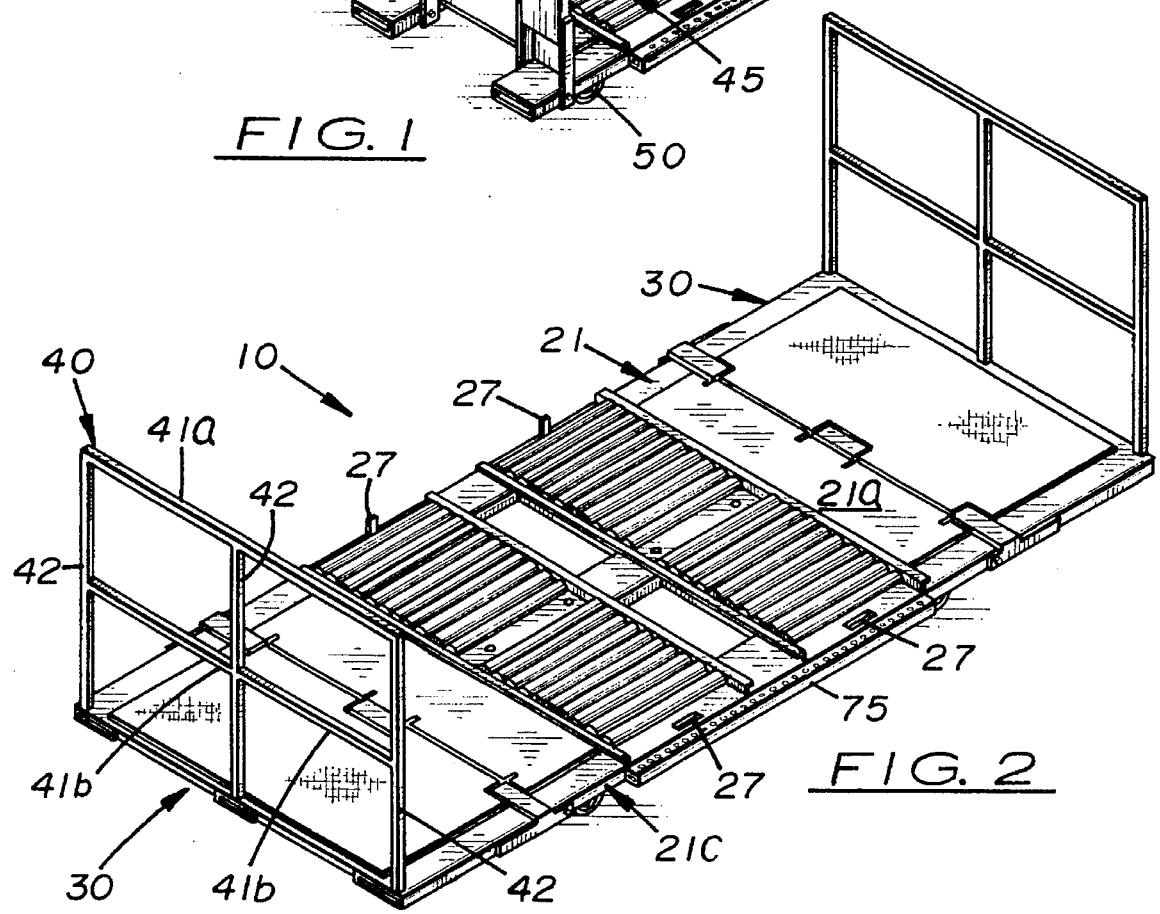
FIG. 2 is a perspective view of the cargo cart with the walkways placed in an extended position.
Figure 3:
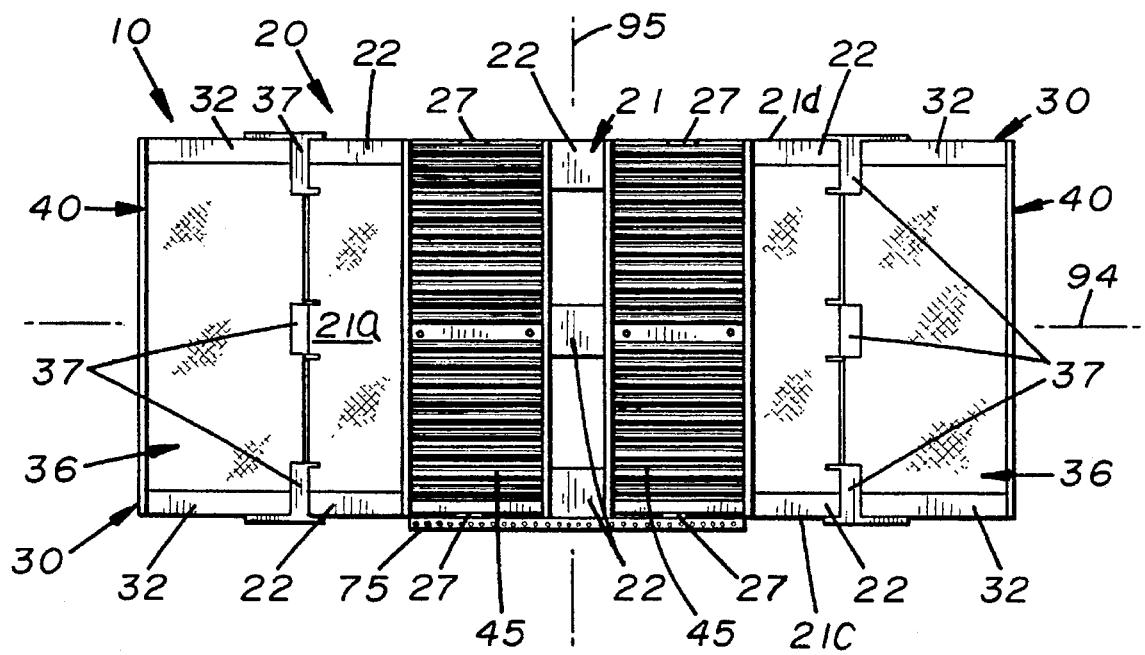
FIG. 3 is a top view of the cargo cart.

The present invention meets the above stated objects by providing a cargo cart, generally referred to as 10, as shown in the accompanying FIGS. 1–9.

The cargo cart 10 is specially designed to transport loose cargo or one cargo container, measuring approximately 88×66 inches between the bed of a delivery truck and the ground by attaching to a hydraulic lift gate on the delivery truck. As shown more clearly in FIGS. 3–4, the cargo cart 10 comprises a pallet structure 20 having a rectangular-shaped rigid frame 21. Rigid frame 21 has a top surface 21a, a bottom surface 21b, a front surface 21c, and a rear surface 21d. In the preferred embodiment, the rigid frame 21 is made up of three, equal spaced, parallel longitudinal members 22 each made of (2×6) inch rectangular, steel tubing measuring approximately eighty-eight inches in length. Each adjacent pair of longitudinal members 22 are connected together with two cross beams 25. The cross beams 25 are aligned substantially perpendicular to the rigid frame's longitudinal axis 94 and securely attached near the opposite ends thereof. Each cross beam 25 is made of (2×6) inch rectangular steel tubing measuring approximately twenty-four inches in length.

Attached to the top surface 21a of the rigid frame 21 are two, spaced apart roller assemblies 45. The roller assemblies 45 extend traversely in a parallel to the rigid frame's traverse axis 95. In the preferred embodiment, each roller assembly 45 comprises two C-shaped, parallel frame members 46 with twenty-one rollers 47 aligned in a parallel manner there across. Each roller 47 is approximately twenty-two inches in length, two inches in diameter, and sufficient strong so that each roller assembly 45 can carry approximately 3,500 lbs. In the preferred embodiment, each roller assembly 45 has twenty-one rollers 47, each measuring approximately twenty-two inches in length and 2 inches in diameter. The roller assemblies 45 are spaced approximately twelve inches apart so that a standard size air cargo container may be fully supported thereon when placed on the cargo cart 10. The rollers 47 are capable of freely rotating thereby allowing a cargo to slide traversely over the cargo cart 10.

The area of the top surface 21a of the rigid frame 21 adjacent to the roller assemblies 45 are covered by two support surfaces while the space between the roller assemblies 45 is opened. In the preferred embodiment, the two support surfaces comprise two solid metal plates 26 each approximately ⅜ inch thick with a textured top surface, such as material commonly referred to as diamond plate. Suitable connectors are used to securely attach the metal plates 26 to the top surface 21a of the rigid frame 21. In other embodiment, the support surfaces may comprise two metal grid material to reduce weight.

Figure 4:
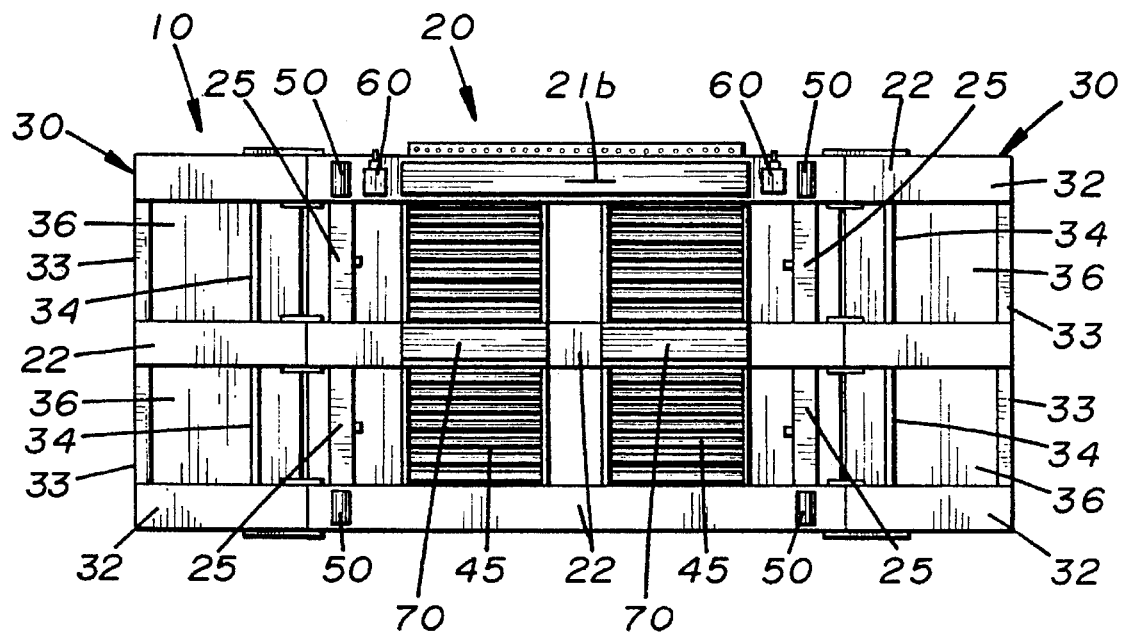
FIG. 4 is a bottom view of the cargo cart.

As shown in FIG. 4, extending downward from the bottom surface 21b of the rigid frame 21 near each corner thereof are four wheel assemblies 50 which enable the cargo cart 10 to be manually moved over a flat surface. Each wheel assembly 50 is attached directly to the bottom surface of a longitudinal member 22 near each opposite end. Each wheel assembly 50 is able to rotate freely 360 degrees, thereby enabling the cargo cart 10 to be moved in any direction over the flat surface. In the preferred embodiment, the each wheel is approximately four inches in diameter and with each wheel assembly 50 being capable of supporting approximately 750 lbs of cargo. When assembled, the bottom surface 21b of the rigid frame 21 is approximately one and one-half inches above the flat surface while the top surfaces of the rollers 47 are positioned approximately eight and one-half inches above the flat surface.

Figure 5:
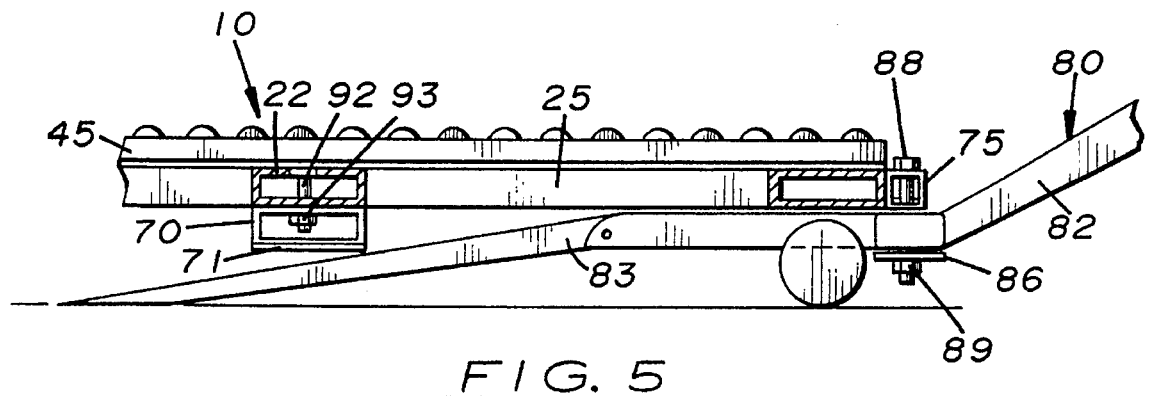
FIG. 5 is a partial side elevation view of the cargo cart located on the ground with a lift gate placed thereunder.
Figure 6:
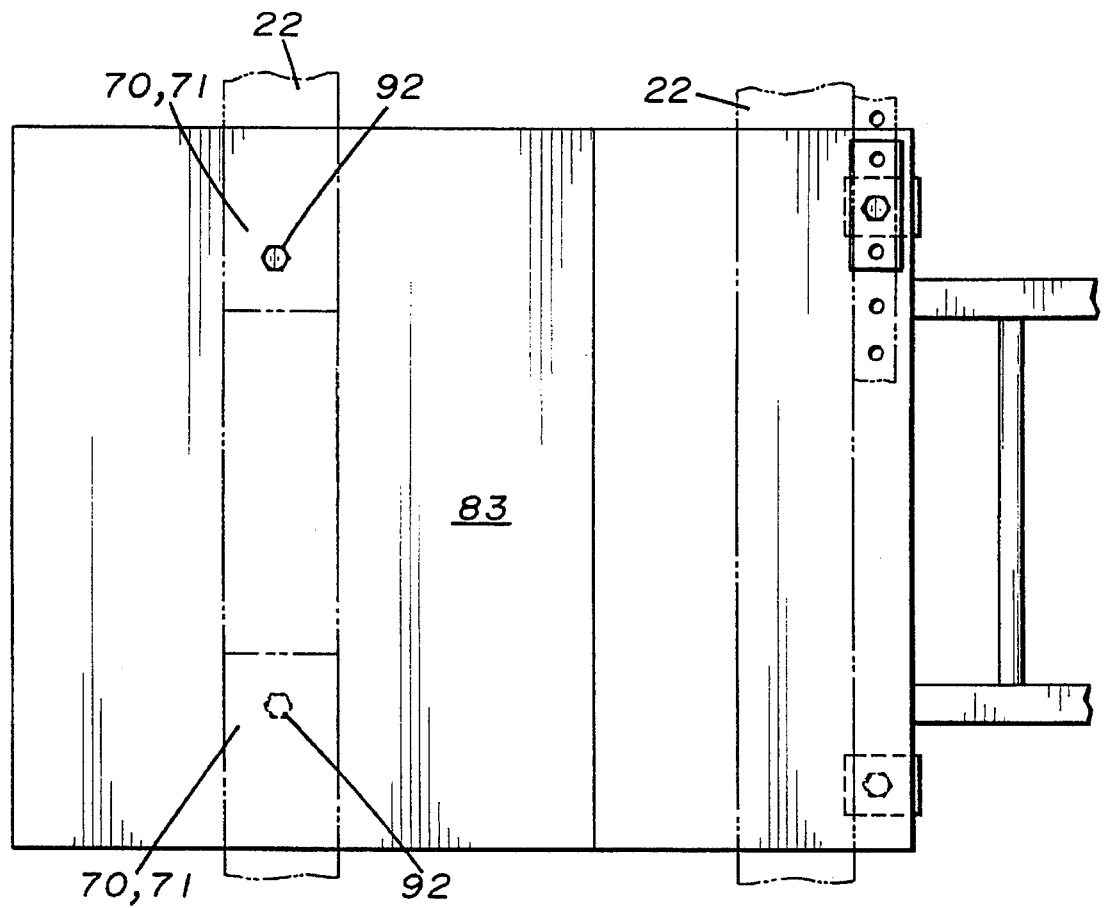
FIG. 6 is a partial top plan view of the cargo cart with the lift gate placed thereunder as shown in FIG. 5.

As shown more clearly in FIG. 5–6, attached to the front surface 21c of the rigid frame 21 is a lift gate connecting means which enables the cargo cart 10 to be selectively and securely attached to a standard lift gate 80 located on a delivery truck. The lift gate connecting means comprises an elongated connection tube 75, two connecting bolts 88, two washer plates 86, and two nuts 89. The connection tube 75 is attached to the vertically aligned front surface of the longitudinal member 22. The connection tube 75 has sufficient length to completely extend in front of the two roller assemblies 45. Manufactured in the connection tube 75 are a plurality of vertically aligned holes through which the connecting bolts 88 may be extended.

To attached the lift gate 80 to the cargo cart 10, the lift gate's platform 83 is placed under cargo cart 10 so that the leading edge of the platform 83 is disposed under central longitudinal member 22. On some lift gates, the angle of the platform 83 may be adjusted by the operator so that the load is disposed horizontally when lifted by the lift gate to facilitate moving cargo onto and off the cargo cart 10. With lift gates that do not have platforms which are adjustable, an optional spacer beam 70 may be attached to the bottom surface of the central longitudinal beam 22. The spacer beam 70 has sufficient thickness so that when the cargo cart 10 is lifted upward, the top surface 21a of the rigid frame 21 is horizontally aligned. In the preferred embodiment, the spacer beam 70 is made of (2×6) rectangular steel tubing and has a sufficient length to extend longitudinally beneath the two roller assemblies 45. Bolts 94 and nuts (not shown) are used to attach the spacer beam 70 to the central longitudinal member 22. Attached to the bottom surface of the spacer beam 70 is an optional textured plate 71 which has a bottom surface that is complimentary in texture with the top surface of the platform 83. By attaching a texture plate 71 to the spacer beam 70, the platform 83 is better able to engage the cargo cart 10 to prevent movement thereon.

When the platform 83 is properly positioned under the cargo cart 10, the two bolts 88 are extended through holes 76 located on the connection tube 75 to engage the lift gate 80. On many lift gates 80, two horizontally aligned openings 85 are generally found near the front surface of the platform 83 adjacent to the joint between the platform 83 and the frame members 84. A bolt 80 is placed through a hole 76 in the connection tube 75 located directly above each opening 85. A washer plate 86, with a threaded nut 89 attached to the bottom surface thereof, is attached to the distal end of the bolt 88 as it extends downward below the opening 85. Each bolt 88 is then tighten, thereby forcing the washer plate 86 against the bottom surface of the frame member 84 to securely attach the cargo cart 10 to the lift gate 80. The lift gate 80 may then be operated to lift the cargo cart 10 to a desired elevation. To remove the cargo cart 10 from the lift gate 80, the above procedure is reversed.

It should be understood that the cargo cart 10 may be attached to other types of lift gate designs. For example with lift gates that do not have openings 85, holes may be drilled through the lift gate frame work or platform 83 through which bolts 88 may be extended and attached to a washer plate 86 to attach the cargo cart 10 to the lift gate.

In the preferred embodiment, the lift gate 10 includes to two optional, rectangular walkways 30 which are attached to the sides of the pallet structure 20. Each walkway 30 includes three main beams 32, two end beams 33, and two support beams 34. The main beams 32, which are made of (2×6) rectangular steel tubing, are spaced apart and longitudinally aligned with the longitudinal members 22 on the rigid frame 21. The end beams 33, which are made of (2×2) square steel tubing, are aligned perpendicular with the main beams 32 and attached between the central main beam 32 and the two front and rear main beams 32. The support beams 34, which are made of (1×1) square steel tubing, are aligned perpendicular to the main beams 32 and attached between the central main beam 32 and the front and rear main beams 32 near the ends that attach to the rigid frame 21. Attached over the top surface of each walkway 30 is textured steel plate 36 designed to support the user. In the preferred embodiment, the textured steel plate 36 is made of ⅜ diamond plate material.

A plurality of hinges 37 are used to pivotally attach the two walkways 30 to the opposite sides of the pallet structure 20. As shown in FIG. 7, three hinges 37 are used in the preferred embodiment with each hinge 37 comprising two vertically aligned attachment plates 39 fixed to the opposite vertical sides of a longitudinal member 22, a horizontally aligned central plate 44 attached to the top surface of the adjoining main beam 32, and a pivoting pin 38. To connect a walkway 30 to the rigid frame 21, the extending end of the main beams 32 are placed adjacent to the extending end of the adjoining longitudinal members 22. Holes 35, manufactured on the main beam 32, are then registered with holes 48 manufactured near the extending end of each attachment plate 39. A pivoting pin 38 is then inserted into the holes 35, 48 to attach the main beam 32 and longitudinal member 21 together. A cotter pin 43 is then inserted in the hole 49 manufactured near the end of the pivoting pin 38 to prevent the pivoting pin 38 from sliding outward. During use, the hinges 37 enable the walkways 30 to be rotated vertically upward for compact storage as shown in FIGS. 1 and 5. By removing the pivoting pins 38, the user is able to remove the walkways 30 from the pallet structure 20 when desired. Hand rails 40 are also provided on the sides of the walkways 30 to prevent the workers from falling off. Each hand rail 40 includes one top horizontal member 41(*a*), two intermediate horizontal members 41(*b*), and three vertical members 42. The lower ends of the vertically members 42 may be fixed to the top surface of the walkway or removably attached thereto using bolts and nuts (not shown) so that the hand rails 40 may be removed from the pallet structure 20 when desired.

Attached to the bottom surface of the longitudinal member 22 near the front surface 21*c* of the rigid frame 21, on opposites sides of the roller assemblies 45 are two scissor jacks 60. The scissor jacks 60 enable the front surface of the cargo cart 10 to be raised to a desired elevation so that the lift gate's platform 83 may be placed properly under the cargo cart 10. In the preferred embodiment, each scissor jack 60, which is designed to carry a load weighing 3,300 lbs. is designed when fully extended, to extend upward to raise the front surface for the cargo cart 10 approximately fourteen inches above the ground.

To prevent cargo from moving across the cargo cart 10 when the cargo cart 10 is moved, a plurality of stop means are provided on the top surface thereof. As shown in FIGS. 8–9, in the preferred embodiment, each stop means comprises a rotating stop pin 27 capable of being selectively rotated between a horizontally aligned position to an upward extending position. While in the upward extending position, the stop pin 27 prevents movement of the cargo over the roller assemblies 45. Each stop pin 27 is retained in a recessed housing 28 manufactured in the top surface of the front and rear longitudinal members 22 directly in front of and behind each roller assembly 45. A traversely disposed axle 29 is placed inside each housing 28 to pivotally attach the stop pin 27 in the housing 28 thereby enabling it to pivot between one of two possible positions.

In compliance with the statute, the invention has been described in language more or less specific as to structural features. It should be understood, however, that the invention is not limited to the specific features shown since the means and construction shown comprises the preferred forms of putting the invention into effect. The invention is, therefore, claimed in any of its forms or modifications within the legitimate and valid scope of the amended claims, appropriately interpreted in accordance with the doctrine of equivalents.

I claim:

1. A lift gate cargo cart, comprising:
   a. a pallet structure, said pallet structure having rigid frame with a top surface, a bottom surface, a front surface, and a rear surface, a longitudinal axis and a traverse axis;
   b. two roller assemblies attached to said top surface of said rigid frame, said roller assemblies being spaced apart and aligned in a parallel manner over said top surface to support cargo placed onto said pallet structure and to enable cargo to slide on or off said pallet structure during use;
   c. a plurality of wheel assemblies attached to said bottom surface of said rigid frame to enable said pallet structure to be selectively pushed or pulled over a flat surface;
   d. a plurality of stop means attached to said rigid frame for selectively preventing undesired movement of cargo placed onto said roller assemblies during use;
   e. a lift gate connecting means attached to said front surface of said rigid frame, said lift gate connecting means enabling said pallet structure to be selectively and securely attached to a lift gate and;
   f. two walkways attached on opposite sides of said pallet structure.

2. A lift gate cargo cart as recited in claim 1, wherein said lift gate connecting means includes a connection tube having a plurality of holes manufactured therein, a plurality of threaded bolts capable of extending through said connection tube into said lift gate, and a washer nut plate capable of being threadingly attached to said bolts to attach said pallet structure to said lift gate.

3. A lift gate cargo cart as recited in claim 1, further including hinges capable of rotatably attaching said walkways to said pallet structure.

4. A lift gate cargo cart as recited in claim 3, further including hand rails attached to said walkways.

5. A lift gate cargo cart as recited in claim 4, further including a height adjustment means attached to said pallet structure enabling said pallet structure to be selectively adjusted in height to enable a lift gate to be placed under said pallet structure during use.

6. A lift gate cargo cart as recited in claim 5, further including a spacer beam attached to said bottom surface of said pallet structure, said spacer beam being located so that the protruding lip of said lift gate can be placed thereunder during use to lift said lift gate cargo cart.

7. A lift gate cargo cart as recited in claim 1, wherein said stop means includes a pivoting stop pin attached to said rigid frame of said pallet structure, said stop pin capable of being selectively rotated between a blocking and non-blocking position to prevent and allow movement of cargo over said roller assemblies.

8. A lift gate cargo cart as recited in claim 1, further including hand rails attached to said walkways.

9. A lift gate cargo cart as recited in claim 8, further including a spacer beam attached to said bottom surface of said pallet structure, said spacer beam being located so that the protruding lip of said lift gate can be placed thereunder during use to lift said lift gate cargo cart.

10. A lift gate cargo cart as recited in claim 9, wherein said lift gate connecting means includes a connection tube having a plurality of holes manufactured therein, a plurality of threaded bolts capable of extending through said connection tube into said lift gate, and a washer nut plate capable of being threadingly attached to said bolts to attach said pallet structure to said lift gate.

11. A lift gate cargo cart as recited in claim 10, wherein said stop means includes a pivoting stop pin attached to said rigid frame of said pallet structure, said stop pin capable of being selectively rotated between a blocking and non-blocking position to prevent and allow movement of cargo over said roller assemblies.

* * * * *